June 14, 1927.
H. A. ROGERS
1,632,313
GRAMOPHONE RECORD
Filed Dec. 18, 1923
2 Sheets-Sheet 1
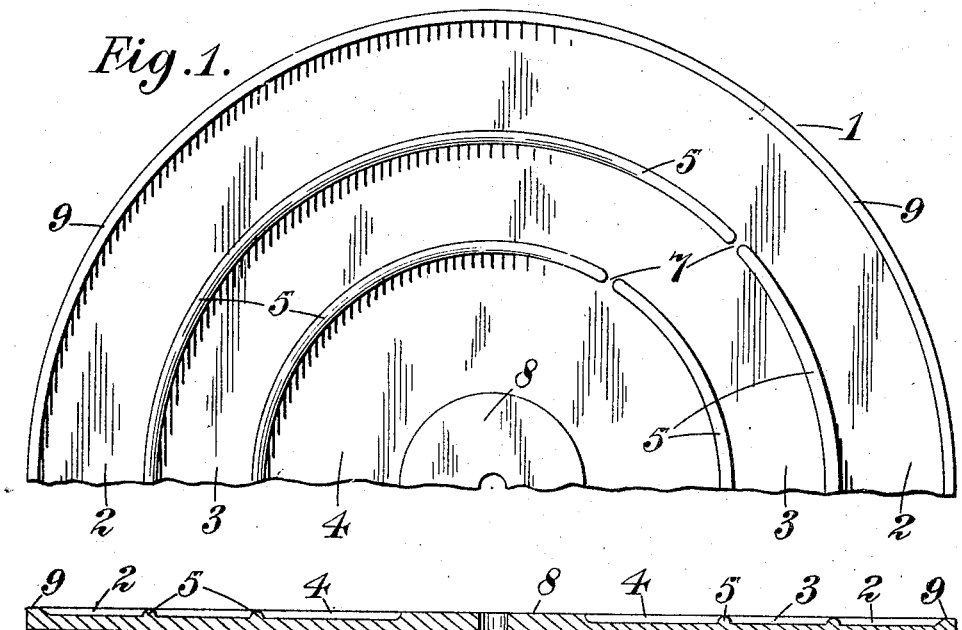
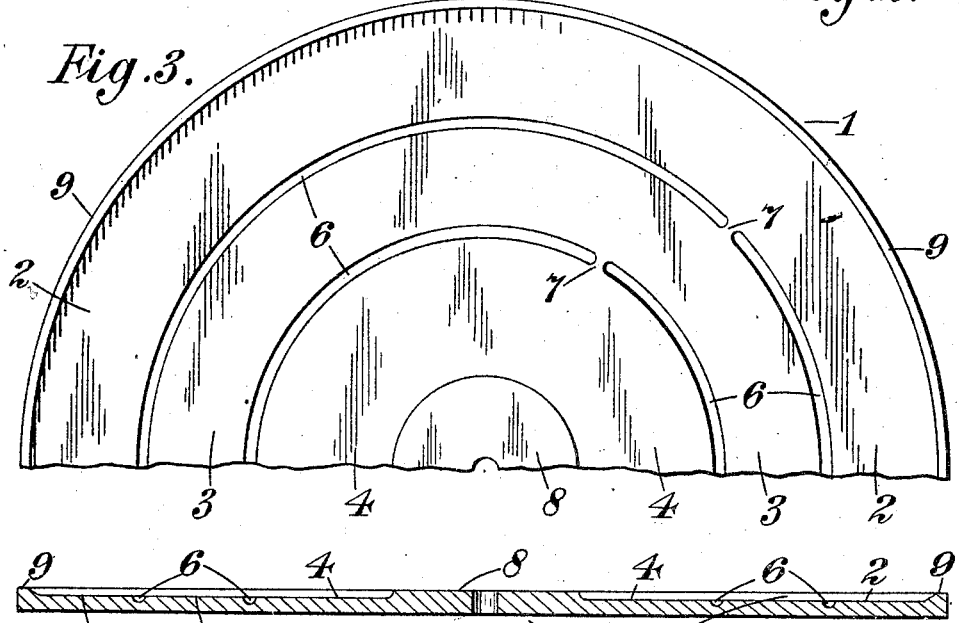
INVENTOR
Harold A. Rogers,
BY Watson, Coit, Morse & Grindle
ATTYS.

June 14, 1927.
H. A. ROGERS
1,632,313
GRAMOPHONE RECORD
Filed Dec. 18, 1923
2 Sheets-Sheet 2
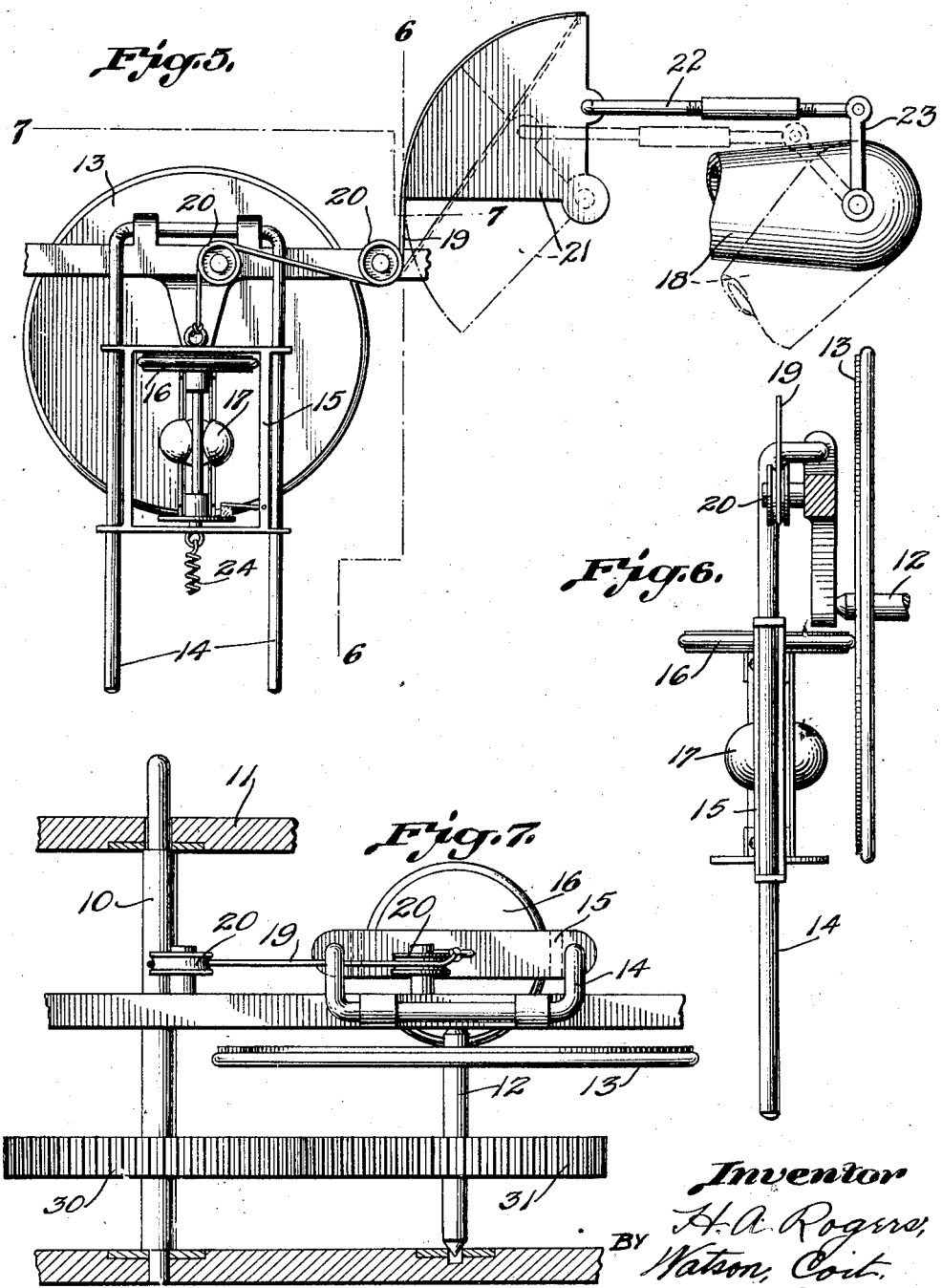

UNITED STATES PATENT OFFICE.

HAROLD ALFRED ROGERS, OF CARDIFF, WALES.

GRAMOPHONE RECORD.

Application filed December 18, 1923, Serial No. 681,436, and in Great Britain December 19, 1922.

This invention relates to gramophone records of the disc type for use with gramophones and like machines; the records may be of either style of cut, vertical or horizontal, and the object of the invention is to provide records for use with such machines which shall offer certain advantages not hitherto obtainable.

In a known form of gramophone, the record is rotated at a uniform angular velocity, and as the needle is traversed over the face of the record to different radial distances from the centre thereof, the "needle velocity" or speed of the needle relatively to the sound track varies proportionally to the said radial distance. This has various objections, amongst which is the limited duration of time of a reproduction which can be formed on a record distance.

It has been proposed to maintain a uniform needle velocity by varying the angular velocity of the record in the inverse ratio of the radial distances of the needle from the centre of the record at the beginning and end of the reproduction. This enables a reproduction of considerably greater duration to be obtained from a record disc, but difficulties are introduced in that at short radial distances an excessive angular speed of the record is called for, and the governor mechanism cannot control satisfactorily a very wide range of angular speeds.

According to the present invention a record for gramophone and like machines has the sound-track produced by rotating the record at an angular speed such that the needle velocity changes, preferably progressively, from the beginning to the end of the record in a ratio which differs from unity and from the ratio of the initial to the final radial distance of the needle on the record. Preferably the said ratio of the needle velocities lies between unity and the ratio of the initial to the final radial distance of the needle.

The invention also comprises a record as above set forth in which the sound-track is produced by rotating the record at an angular velocity which changes preferably progressively from the beginning to the end of the record in a ratio whereof the reciprocal differs from unity and from the ratio of the initial and final radial distances of the needle. The angular velocity according to another feature of this invention changes preferably progressively in a ratio whereof the reciprocal lies between unity and the ratio of the initial and final radial distances of the needle on the record.

In gramophones as ordinarily made, the reproduction commences near the outer edge of the disc, and when a uniform angular speed of rotation of the disc is used, the needle-velocity is a maximum at the commencement and diminishes progressively to the end of the record. In the other known form of record above described, the needle-velocity remains uniform throughout the reproduction, but according to the present invention the needle-velocity diminishes from the beginning to the end of the reproduction, but the ratio of diminution is less than it is in the first case. It will be appreciated that when the reproduction is commenced near the centre of the record and terminates near its edge, the needle-velocity in the known type of record increases or remains uniform, whereas according to the present invention, it increases in a ratio less than the ratio increase of the known form referred to.

Records according to this invention differ from records adapted for uniform angular speed of rotation in that they give long playing periods of time, which is effected by causing the needle to have a lesser initial linear velocity in relation to the disc than that at present in vogue. This can readily be done owing to the unusually wide spacing of the sound marks in the outer grooves in the present type of record. By this means several items may be arranged on the same record, and there may be difficulty in finding the correct spot at which to start intermediate items.

For the sake of convenience in writing the claims the applicant has found it advisable to use the term "vibratory pitch" which is to be understood as meaning the distance between adjacent crests of the wavy track that would be traced out on the rotating record by the stylus needle, if the needle were continuously vibrating at a uniform rate.

A separating line may be used between the items, emphasized to the sight, by colouring or by increased elevation or depression of the surface of the record, but I further overcome the difficulty, by utilizing the sense of touch and making the track immediately before or after any item on a ridge or in a depression of the record surface, so that by feeling the surface with the fingers at or near these ridges or depressions the correct spot to start the needly can be readily found.

The invention is illustrated by the accompanying drawings wherein are shown, by way of examples, different patterns of records having elevations of surface, ridges and depressions which can easily be perceived by touch or sight, and it will be clear that many other patterns can be made on similar lines without departing from the spirit or scope of this invention.

Figure 1 is a half-plan representing a record having three items with ridges and elevations between the items and thickened at the centre and periphery, and Figure 2 is a cross-section of Figure 1;

Figures 3 and 4 are half-plan and section respectively of a similar record but with depressions separating the items.

Figure 5 is a plan view showing the governor mechanism and its connection with the tone arm;

Figure 6 is a side elevation of the governor and its mounting, as seen in the direction of the arrows 6—6 in Fig. 5; and Figure 7 is an end elevation as seen in the direction of the arrows 7—7 in Fig. 5.

In the drawings, the record 1 has different items in the spaces 2, 3 and 4, these spaces being separated by the ridges 5 (Figure 1) or by the depressions 6 (Figure 3). These ridges and depressions are easily found by feeling the surface of the record with the fingers, or they can be coloured or made sufficiently high or deep to be recognized by sight. Gaps 7 are arranged in the ridges or depressions to show where the needle-groove or sound-track begins the item. The central and peripheral thickenings above referred to are shown at 8, 5 and 9.

The records shown are of the kind whereon the needle-grooves start at the outer margin of the spaces 2, 3 or 4 and finish at the inner margin, but records whereon the needle moves from the inner margin outwardly may equally well be used.

The spindle 10 of the turntable 11 is geared in any convenient manner as by means of gears 30 and 31 with a shaft 12 carrying a friction disc 13 which consequently rotates at a speed proportional to that of the turntable. Power to drive the turntable is preferably applied to the shaft 10 either through the gears already thereon or other suitable gearing from any approved form of driving motor (not shown). This motor may also be connected to drive the friction disc 13 in any suitable manner instead of the shaft 10.

Adjacent the friction-disc there is mounted a frame 14 which extends radially across the disc and forms a guide whereon there slides a second frame 15 which carries a friction-wheel 16 and any suitable governor mechanism 17 whereby this friction-wheel 16 is caused to rotate at a uniform speed. The friction-wheel 16 engages the face of the friction-disc 13 so as to be driven by it, the engagement conveniently being provided for under gravity, the frame 14 being pivoted to swing about an axis lying parallel with the plane of the disc 13, and being cranked or offset, as clearly shown in Figures 2 and 3, so that it tends to fall towards the disc 13.

Since the friction-wheel 16 is controlled by its governor to run at a constant speed, it controls the speed of the friction-disc 13 by its engagement therewith; if it is moved nearer to the centre of the disc it permits the latter to rotate at a higher speed than when it is moved towards the outer periphery of the disc. The disc 13 is geared to the spindle of the turn-table, as mentioned above, so that the speed of the turn-table is directly controlled by the friction-wheel 16, being determined by the radial distance of the latter from the centre of the friction-disc 13. This traversing movement may be provided for by any suitable operative connection between the friction-wheel 16 and the tone-arm 18, or some other part which moves with the needle; in the illustrative embodiment a flexible connection 19, such as a piece of catgut, is secured to the frame 15 and led over guide-pulleys 20 to a pivoted quadrant 21 and is secured thereto. This quadrant is coupled by a connecting-rod 22 to an arm 23 which is fixed on the tone-arm 18 so as to partake of the rotative movements thereof, and by a suitable proportion and arrangement of this operative connection, the uniform movement of the needle across the record gives any desired movement of the friction-wheel 16 across the surface of its co-operating friction-disc 13.

When the friction-wheel 16 is arranged to move horizontally across the friction-disc 13 a light spring 24 may be provided for returning the friction-wheel to the outer portion of the friction-disc 13. The friction-disc 13 may, however, be arranged slantwise so that the frame 15, and the parts carried thereby, will return to its outer position under gravity.

The arrangement for the purposes of this invention, is such as to cause the ratio of the initial to the final radial distance of the needle on the turn-table to be greater than the ratio of the initial to the final radial distance of the friction-wheel 16 on the friction-disc 13.

What I claim as my invention and desire to secure by Letters Patent is:—

1. A gramophone or like record of the disc type, produced by recording sounds in a rotating blank, said blank rotating at a speed which varies in such manner that the needle velocity changes from the beginning to the end of the record in a ratio which lies between unity and the ratio of the initial to the final radial distances of the needle on the record.

2. A gramophone or like record of the disc type, produced by recording sounds in a rotating blank, said blank rotating at a speed which constantly varies in such a manner that the blank moves in relation to the needle, at any point, at a speed intermediate to that speed corresponding to uniform angular velocity and that speed corresponding to uniform linear velocity.

3. A gramophone or like record of the disc type, whereof the vibratory pitch of the sound track is variable between limits corresponding to that produced by uniform angular velocity and that produced by uniform linear velocity.

4. A gramophone or like record of the disc type, whereof the vibratory pitch of the sound track has at any given point in the length of the track a value intermediate that value which corresponds, at the point in question, to uniform angular velocity of the record and that other value which corresponds to uniform linear velocity of the sound track at the needle.

In testimony whereof I affix my signature.

HAROLD ALFRED ROGERS.